United States Patent [19]
McKenna, Jr.

[11] 3,886,126
[45] May 27, 1975

[54] SOLUTIONS OF PRESSURE-SENSITIVE RESIN SOLUTIONS WITH IMPROVED VISCOSITY AND FLOW

[75] Inventor: Lawrence W. McKenna, Jr., Wilbraham, Mass.

[73] Assignee: Monsanto Company, St. Louis, Mo.

[22] Filed: Apr. 9, 1973

[21] Appl. No.: 349,512

[52] U.S. Cl. ... 260/80.73; 260/31.2 N; 260/32.8 N; 260/33.6 UA
[51] Int. Cl. ............................................. C08f 15/40
[58] Field of Search ......... 260/29.1 R, 80.73, 80.75, 260/80.8, 80.81, 78.5 T

[56] References Cited
UNITED STATES PATENTS 2,720,468  10/1955  Shacklett ........................ 260/2 T X
3,467,610  9/1969   Flarman et al. ............. 260/29.1 R X
3,769,254  10/1973  Anderson et al. ........... 260/80.71 X Primary Examiner—Lewis T. Jacobs
Attorney, Agent, or Firm—R. Bruce Blance; E. P. Grattan; J. C. Logomasini

[57] ABSTRACT

Pressure-sensitive resin solutions containing chelate esters of orthotitanic acid and interpolymers comprising at least one monomer containing a hydroxyl, carboxyl or enolizable keto group. The solutions exhibit improved viscosity and flow and thus are suitable for application on high speed roll coaters.

4 Claims, No Drawings

SOLUTIONS OF PRESSURE-SENSITIVE RESIN SOLUTIONS WITH IMPROVED VISCOSITY AND FLOW

BACKGROUND OF THE INVENTION

1. Field of the Invention

The present invention relates to organic solvent solutions containing chelate esters of orthotitanic acid and resins with functional groups capable of reaction with the esters. In another aspect, the invention relates to a process of manufacture of articles containing films of pressure-sensitive resin.

2. Description of the Prior Art

Pressure-sensitive resins are used conventionally in the form of films to provide adhesive bonds between normally non-adhering superstrates and substrates. The films may be prepared by casting them from organic solvent solutions and evaporating the solvent.

Constraints are placed on the molecular weight of the pressure-sensitive resin by the viscosity of the solution necessary for ease of coating on commercial coating machines and by the solution concentration required for economical operation. In general, low solution viscosity and high solution concentration are desired in the pressure-sensitive resin solution, and, hence, a resin of relatively low molecular weight is preferred for film casting.

Once a bond has been made by a pressure-sensitive film placed between a substrate and a superstrate, the pressure-sensitive film may be subjected to stress generated by the weight of the superstrate or by dimensional change in the substrate or superstrate caused by thermal expansion, stress relaxation, plasticizer migration or the like. In general, a high molecular weight and a high cohesive strength is desired in the pressure-sensitive resin so that it may resist the stresses induced in the adhesive film. The opposing requirements of low molecular weight resin for ease of coating and high molecular weight resin for load holding ability are conventionally reconciled by the use of crosslinkable resin systems which can be applied at low molecular weight and cured to a high molecular weight.

Metal alkoxides are taught by Blance in U.S. Pat. No. 3,532,708 as crosslinking agents for solution pressure-sensitive adhesives. They offer the potential of cure at room temperature merely by evaporation of the solvent. Of particular interest have been tetraalkyl titanates which are formulated with hydroxy pressure-sensitive resins in alcohol solutions to yield stable solutions from which crosslinked pressure-sensitive resins are obtained by evaporation of the alcoholic solvent. However, such titanates particularly the lower alkyl titanates impart high solution viscosity and undersirable flow to the resin solutions.

The undesirable flow is manifested by the tendency of the resin solution to form a highly extened "string" or column of fluid when a spatula or like object is pulled rapidly out of the solution. Solutions exhibiting such "stringiness" are difficult to apply on modern high-speed coating machinery. Uneven splitting and transfer of the adhesive solution on the rolls causes uneven coating. On reverse roll coaters, the formation of strings at the roll nips produces a ribbed effect in the coating and on gravure rolls, webs of solution produce coating defects.

There is, therefore, a need in the art for pressure-sensitive resin solutions with suitable viscosity and flow for application by coating rolls and which yield pressure-sensitive resins curable at room temperature or at slightly elevated temperatures to yield adequate cohesive strength.

SUMMARY OF THE INVENTION

The above-mentioned need in the art is fulfilled by the present invention which provides pressure-sensitive resin solutions with improved viscosity and flow. The pressure-sensitive resin solutions comprise an organic solvent solution of:

1. an interpolymer having a weight average molecular weight in the range of 10,000 to 500,000 and a glass transition temperature in the range of $-15°$ to $-75°C$., the interpolymer comprising:
    A. between 0.5 and 20 weight per cent of at least one monomer containing a hydroxyl, carboxyl or enolizable keto group,
    B. at least one monomer selected from the group consisting of esters of acrylic acid and methacrylic acid containing from six to 20 carbon atoms, and
    C. optionally, a monomer selected from the group consisting of $\alpha$-olefins containing from two to 10 carbon atoms, vinyl esters of alkanoic acids containing from three to 10 carbon atoms, ethyl and methyl esters of acrylic and methacrylic acids, acrylonitrile, methacrylonitrile, styrene and vinyl chloride; and
2. a chelate ester of orthotitanic acid having the formula: v,

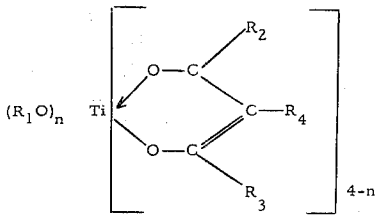

wherein $n$ is an integer of 2 or 3, $R_1$ is a $C_2$ to $C_{10}$ alkyl, alkenyl, substituted alkyl or substituted alkenyl group, $R_2$ is a $C_1$ to $C_6$ alkyl, alkoxy, alkenyl or alkenoxy group, $R_3$ is a $C_1$ to $C_6$ alkyl or alkenyl group or a $C_6$ to $C_{10}$ aryl group and $R_4$ is hydrogen or a $C_1$ to $C_6$ alkyl or alkenyl group, and $R_2$ and $R_3$ may be combined as an ethylene or a trimethylene group.

The invention further provides a process for preparing pressure-sensitive resin solutions with improved viscosity and flow and a process for coating them as films on substrates to provide articles of manufacture comprising films of pressure-sensitive interpolymer containing the above-described chelate esters of orthotitanic acid.

DESCRIPTION OF THE INVENTION

The practice of the present invention involves the preparation of the interpolymer which is then formulated with the chelate ester of orthotitanic acid in a suitable organic solvent. The solution is cast on a substrate and the resulting film is dried and cured to a creepresistant permanently tacky composition.

The interpolymer comprises monomers selected from the groups A, B, and C described above. Group A monomers contain hydroxyl, carboxyl or enolizable keto groups. Monomers containing hydroxyl groups are exemplified by hydroxyalkyl acrylates, hydroxyalkyl methacrylates, hydroxyalkyl fumarates and hydroxyalkyl maleates wherein the alkyl group contains from two to four carbon atoms. Preferred hydroxy monomers include 2-hydroxyethyl acrylate and methacrylate, 2- hydroxypropyl acrylate and methacrylate and 3-hydroxypropyl acrylate and methacrylate, and bis(2-hydroxyethyl) fumarate and maleate. Monomers containing carboxyl groups are exemplified by acrylic acid, methacrylic acid, crotonic acid, isocrotonic acid, and the like, maleic acid, fumaric acid, citraconic acid, itaconic acid, and the like, and the alkyl monoesters of maleic acid, fumaric acid, citraconic acid and itaconic acid in which the alkyl group contains from one to eight carbon atoms such as methyl, ethyl, propyl, butyl and octyl maleates and the like. Preferred acid monomers include acrylic acid and methacrylic acid. Monomers containing enolizable keto groups include N,N-diacetonylacrylamide and N,N-diacetonylmethacrylamide. The amount of groups A monomer in the interpolymer is generally in the range of 0.5 to 20 weight per cent of the interpolymer, and is preferably in the range of 1 to 10 per cent for adequate crosslinking potential without excessive solution viscosity.

Group B monomers include the esters of acrylic and methacrylic acid containing from six to 20 carbon atoms. Preferred esters contain branched chain alkyl groups such as isobutyl acrylate, 2-ethylhexyl acrylate and 2-ethylhexyl methacrylate. The pressure-sensitive resin need only contain monomers from groups A and B. However, optionally, monomers from Group C may also be present. Group C includes α-olefins containing from two to 10 carbon atoms, vinyl esters of alkanoic acids containing three to 10 carbon atoms such as vinyl acetate and vinyl octoate, ethyl and methyl esters of acrylic and methacrylic acids, acrylonitrile, methacrylonitrile, styrene and vinyl chloride.

The ratio of monomers in the interpolymer is selected so that the glass transition temperature is in the range of −15 to −75°C. A suitable ratio is conventionally calculated from the equation:

$$\frac{1}{T_g} = \frac{W_1}{T_{g1}} + \frac{W_2}{T_{g2}} + \ldots \frac{W_n}{T_{gn}}$$

where $T_g$ is the glass transition temperature of the interpolymer expressed as degrees Kelvin, $T_{g1}$, $T_{g2}$, etc. are the glass transition temperatures of the homopolymers of the respective comonomers and $W_1$, $W_2$, etc. are the weight fractions of comonomers required for a specific glass transition temperature of the interpolymer. Glass transition temperatures are determined experimentally by conventional methods such as by means of the duPont Differential Thermal Analyzer.

The weight average molecular weight of the interpolymer is in the range of 10,000 to 500,000, corresponding to a relative viscosity in the range of 1.3 to 8.0 measured on a solution of 2 grams of interpolymer per deciliter of benzene. The preferred molecular weight range is from 20,000 to 300,000, providing adequate cohesive strength to the interpolymer without excessive solution viscosity.

The interpolymers are conveniently prepared by organic solvent polymerization techniques involving in some cases delayed addition of monomer when there is a great disparity between reactivity ratios as for example between the reactivity ratios of vinyl acetate and acrylate monomers. The time interval for the delayed addition may range from about 60 to about 600 minutes and longer. The techniques in general, involve the polymerization of the respective monomer mixtures in suitable organic solvents, the polymerization being initiated by heat activated free radical initiators.

The choice of solvents for the interpolymer used in the practice of this invention is governed by the solubility requirements of the monomers and the resulting interpolymers in that both the monomers and the resulting interpolymers should be soluble in the selected solvent or mixtures of solvents. A further requirement is that the interpolymer solution should contain less than 3 per cent water by weight, based on the total weight of the solvent, in order to avoid adverse interference with the metal alkoxide component. More preferably, the interpolymer solution should contain less than 2 per cent water by weight.

Examples of suitable solvents for the interpolymers include aromatic solvents such as benzene, toluene, xylene, etc. Suitable aliphatic solvents include esters such as ethyl acetate, propyl acetate, isopropyl acetate, butyl acetate, etc.; ketones such as methyl ethyl ketone, acetone, etc.; aliphatic hydrocarbons such as hexane, pentane, etc. Especially useful are mixtures of the foregoing.

The polymer systems of this invention may also be prepared in mass or non-aqueous dispersion type polymerization processes as are well known to those skilled in the art. However, solution polymerization processes are preferred.

Polymerization initiators suitable for the preparation of the special interpolymers of this invention include organic peroxides, such as tert-butyl hydroperoxide, di-tert-butylperoxide, cumene hydroperoxide, di-cumyl peroxide, benzoyl peroxide and the like. Equally suitable are organic peroxygen compounds such as tert-butyl peracetate, acetate, tert-butyl perbenzoate, di-tert-butyl perphthalate; other initiators would include α, α′-azo-di-isobutyronitrile, ultraviolet light, gamma radiation, etc.

The following Examples 1 to 13 illustrate the preparation formulation and testing of the special interpolymers which are to be used in the practice of this invention and are not to be construed as limitations thereof. All parts and percentages are by weight unless otherwise specified and the expressions polymer and interpolymer are used interchangeably.

PREPARATION OF INTERPOLYMERS

EXAMPLE 1

This Example illustrates the preparation of an interpolymer comprising 50.5 parts 2-ethylhexyl acrylate, 45 parts methyl acrylate and 4.5 parts 2-hydroxyethyl acrylate.

The polymer is prepared under reflux conditions in a kettle equipped with a stirrer, condenser, holding tanks and pumps,

| AMOUNT OF INGREDIENTS, Parts by Weight | | | | |
|---|---|---|---|---|
| | Initial Charge | Subsequent charges | | |
| | | 1 | 2 | 3 |
| 2-ethylhexyl acrylate | 14.1 | | 6.97 | |
| Methyl acrylate | 12.6 | | 6.20 | |
| 2-hydroxyethyl acrylate | 1.26 | | 0.62 | |
| Ethyl acetate | 19.69 | 12.3 | | 9.0 |
| Hexane | 5.14 | | 2.74 | 9.26 |
| α,α′-azo-diisobutyronitrile | 0.076 | 0.038 | | |
| Dodecyl mercaptan | 0.0027 | 0.0013 | | |

Charges 1 to 2 are made at uniform rates over the 1¼ hour period after the initial charge reaches reflux. After 6½ hours of reflux, the batch is cooled and charge 3 is added. The solids content is 41.0 per cent. The Brookfield viscosity is 3,000 cps. The relative viscosity, determined with a solution of 2 grams of resin in 100 ml. benzene is 4.1.

EXAMPLES 2 to 11

The general procedure of Example 1 is followed except that different monomers and monomer ratios are used in order to illustrate a variety of interpolymers used in the practice of this invention.

TABLE 1

COMPOSITIONS OF INTERPOLYMERS PREPARED IN EXAMPLES 1 to 11

| Ex. | Monomeric Components | Weight Ratio |
|---|---|---|
| 1 | EHA/MA/HEA | 50.5/45/4.5 |
| 2 | EHA/VAc/AA | 59/39.5/1.5 |
| 3 | EHA/VAc/AA | 52/47/1.0 |
| 4 | EHA/MA/AA | 61/33/6.2 |
| 5 | EHA/MA/HEA | 71/24/5 |
| 6 | iBA/MA/HEA | 71/24/5 |
| 7 | VAc/EHA/HPA | 45/50/5 |
| 8 | VAc/EHA/HEMA | 35/60/5 |
| 9 | VAc/EHA/HEF | 40/55/5 |
| 10 | AN/EHA/HEMA | 25/70/5 |
| 11 | VCl/EHA/HEMA | 30/65/5 |

LEGEND

| | |
|---|---|
| EHA | 2-ethylhexyl acrylate |
| MA | methyl acrylate |
| HEA | 2-hydroxyethyl acrylate |
| VAc | vinyl acetate |
| AA | acrylic acid |
| HPA | 3-hydroxypropyl acrylate |
| HEMA | 2-hydroxyethyl methacrylate |
| HEF | bis-(2-hydroxyethyl) fumarate |
| AN | acrylonitrile |
| VCl | vinyl chloride |
| iBA | isobutyl acrylate |

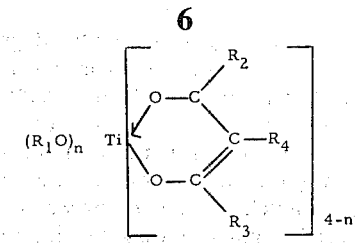

wherein $n$ is an integer of 2 or 3, $R_1$ is a $C_2$ to $C_{10}$ alkyl, alkenyl, substituted alkyl or substituted alkenyl group, $R_2$ is a $C_1$ to $C_6$ alkyl, alkoxy, alkenyl or alkenoxy group, $R_3$ is a $C_1$ to $C_6$ alkyl or alkenyl group or a $C_6$ to $C_{10}$ aryl group and $R_4$ is hydrogen or a $C_1$ to $C_6$ alkyl or alkenyl group, and $R_2$ and $R_3$ may be combined as an ethylene or a trimethylene group.

The chelate esters are prepared by conventional methods such as the addition of the appropriate chelating agent to an alkyl or alkenyl titanate wherein the alkyl or alkenyl group contains two to 10 carbon atoms. Among the chelating agents which can be used are, for example, acetylacetone, propionylacetone, benzoylacetone, 1,3-cyclopentandione, 1,3-cyclohexandione, alkyl acetoacetates, such as ethyl acetoacetate, and the alkyl and alkenyl substituted derivatives of these diketones and acetoacetates. Thus, where acetylacetone is used as the chelating agent the $R_2$ and $R_3$ groups are methyl and the $R_4$ group is hydrogen. The chelating agents may be reacted with the lower alkyl or alkenyl titanate in a molar ratio ranging from 1:1 to 2:1. The preferred ratio is about 2:1 so that, for example, when acetylacetone is used, a dialkoxy titanium diacetylacetonate is obtained. The alkanol generated by the reaction may be distilled. Alternatively, it may be allowed to remain so that the product of reaction is essentially a solution of chelate ester in alkanol. The preferred chelate esters are dialkoxy titanium diacetylacetonates,

TABLE 2

SOLUTION PROPERTIES OF INTERPOLYMERS OF EXAMPLES 1 to 11

| Ex. | SOLVENT, Weight % | | | | | Solids, % | Viscosity, cps. | Relative Viscosity |
|---|---|---|---|---|---|---|---|---|
| | Ethyl Acetate | Toluene | Hexane | iPrOH | EtOH | | | |
| 1 | 70 | — | 30 | — | — | 41 | 3,000 | 4.1 |
| 2 | 50 | — | 50 | — | — | 50 | 15,000 | 2.7 |
| 3 | 10 | 19 | 71 | — | — | 56 | 30,000 | 3.2 |
| 4 | 75 | — | 15 | 10 | — | 39 | 15,000 | 4.3 |
| 5 | 70 | — | 20 | 10 | — | 41 | 5,200 | 4.7 |
| 6 | 60 | 20 | — | — | 20 | 41 | 12,000 | — |
| 7 | 74 | — | 18 | — | 8 | 42 | 8,800 | 5.7 |
| 8 | 74 | — | — | — | 26 | 40 | 8,500 | — |
| 9 | 74 | — | — | — | 26 | 43 | 9,200 | — |
| 10 | 20 | 80 | — | — | — | 37 | — | — |
| 11 | 100 | — | — | — | — | 41 | — | — |

FORMULATION OF RESIN SOLUTIONS WITH CHELATE ESTERS OF ORTHOTITANIC ACID

After the preparation of the interpolymer, the interpolymer solution is formulated with at least one chelate ester of orthotitanic acid of the general formula:

dialkyl titanium di(1,3-cyclopentandionates) and dialkoxy titanium di(1,3-cyclohexandionates).

The amount of chelate ester used in a given resin solution will depend on the type of reaction group in the interpolymer, the molecular weight of the interpolymer, the concentration of interpolymer in the solution, the composition of the solvent and the degree of crosslinking desired in the pressure-sensitive resin after it has been cast from solution. As little as 0.01 parts by weight of the chelate ester per 100 parts by weight of interpolymer can give a significant effect on the cohesive strength of the polymer as measured by the creep resistance. As much as 4.0 parts by weight of the chelate ester per 100 parts by weight of interpolymer can be used especially with lower molecular weight interpolymer and/or lower concentrations of functional groups. However, the preferred range is between 0.1 and 1.0 parts by weight per 100 parts of interpolymer to achieve an appreciable degree of crosslinking without an undesirable increase in the viscosity of the resin solution.

Unlike the lower alkyl titanates, the chelate esters of orthotitanic acid may be added to the interpolymer solutions in the absence of highly polar solvents such as the lower alcohols and much higher concentrations of resin and chelate ester can be achieved in the solution without excessive viscosity, stringiness or gelling. However, it may still be advantageous to include a lower alcohol in the resin solution to increase the solubility parameter of the solvent, particularly when the substrate to be coated can be swollen by the less polar solvents which are conventionally used in the solution interpolymerization process. Apart from the optional use of a lower alcohol, conventional solvents and solvent blends are selected for use in the pressure-sensitive resin solutions of this invention on the basis of the solubility requirements of the resin and the nature of the substrate which is to be coated. The solids content of the resin solutions can be varied between 10 per cent and 60 per cent for application to the substrate. The preferred concentration is between 20 and 50 per cent.

EVALUATION OF PRESSURE-SENSITIVE RESIN SOLUTIONS

In the evaluation of pressure-sensitive resin solutions containing esters of orthotitanic acid, the solutions are formulated to 32 weight per cent solids. The esters of orthotitanic acid are added in ethanol solution gradually with stirring to the pressure-sensitive resin solution, the amount of ethanol being 25 weight per cent of the total solvent in the final solution.

The solutions are subjected to determination of viscosity and "stringiness index." Viscosity is determined at 20°C. by the conventional method using a Brookfield Model LVF Viscometer and the appropriate spindle and speed. Viscosity stability is determined from viscosity measurements over a 7 day period.

The stringiness index (S.I.) is determined by immersing a platinum surface tension ring of 3.6 cm diameter, one inch below the surface of the pressure-sensitive resin solution contained in a 3 inch diameter jar. The ring is mounted in the jaw of an Instron Test Machine and is withdrawn from the solution by allowing the crosshead upon which the jar rests to descend at a rate of five inches per minute. The tensile force exerted on the ring is recorded by means of the A cell on the chart set at 10 grams full scale and moving at 5 inches per minute. The stringiness index is measured from the peak of maximum extensional force to the failure point of the elongating curtain of solution. Five measurements are made in rapid succession. The arithmetic average expressed in inches is the stringiness index. In general, a stringiness index of less than 0.30 inch indicates that a resin solution has good flow properties and that the solution will not form strings on conventional high-speed roll coaters at normal speeds of operation. The tendency of a pressure-sensitive resin solution to develop stringiness is determined by measurement of the stringiness index over a 7 day period.

The data for viscosity and stringiness index of the interpolymer solutions of Examples 1–4 formulated with various esters of orthotitanic acid are presented in Tables 3 and 4. The solids content of the solutions is 32 per cent. Ethanol forms 25 per cent of the solvent. In the Tables, TBT signifies tetrabutyl titanate and TAA signifies diisopropoxy titanium diacetylacetonate which is formed by reaction of 2 moles of acetylacetone with 1 mole of tetra-isopropyl titanate.

TABLE 3

EFFECT OF TITANATE TYPE ON SOLUTION VISCOSITIES (viscosities in cps.)

| Titanate | | RESIN | | | | | | | |
|---|---|---|---|---|---|---|---|---|---|
| | | Example 1 | | Example 2 | | Example 3 | | Example 4 | |
| Concentration, grams per 100 g. resin | Type | Initial | Aged 1 week | Initial | Aged 1 week | Initial | Aged 1 week | Initial | Aged 1 week |
| 0 | none | 800 | 850 | 195 | 180 | 375 | 380 | — | — |
| 0.2 | TBT | 1,170 | 1,140 | 270 | 280 | 535 | 560 | — | — |
| | TAA | 810 | 840 | 235 | 240 | 415 | 410 | — | — |
| 0.4 | TBT | 1,920 | 1,800 | 470 | 500 | 1,110 | 1,200 | Gel | Gel |
| | TAA | 870 | 900 | 300 | 345 | 450 | 460 | 7,700 | 14,000 |
| 0.6 | TBT | Gel | Gel | 1,130 | 1,350 | 2,550* | 3,000* | Gel | Gel |
| | TAA | 940 | 1,000 | 250 | 250 | 455 | 480 | 9,000 | 18,000 |

*Very ropy, stringy; not coatable.

TABLE 4

EFFECT OF TITANATE TYPE ON "STRINGINESS INDEX" (in inches)

| Titanate | | RESIN | | | | | |
|---|---|---|---|---|---|---|---|
| | | Example 1 | | Example 2 | | Example 3 | |
| Concentration, grams per 100 g. resin | Type | Initial | Aged 1 week | Initial | Aged 1 week | Initial | Aged 1 week |
| 0 | None | 0.18 | 0.21 | 0.23 | 0.19 | 0.13 | 0.14 |
| 0.2 | TBT | 0.22 | 0.25 | 0.21 | 0.30 | 0.14 | 0.17 |
| | TAA | 0.18 | 0.21 | 0.20 | 0.29 | 0.18 | 0.18 |
| 0.4 | TBT | 0.35 | 0.27 | 0.37 | 0.41 | 0.21 | 0.20 |
| | TAA | 0.20 | 0.19 | 0.18 | 0.26 | 0.18 | 0.18 |
| 0.6 | TBT | — | — | 0.39 | 0.53 | 0.64 | 0.72 |
| | TAA | 0.20 | 0.22 | 0.22 | 0.27 | 0.18 | 0.18 |

The data show the higher viscosities, the tendency to gel and the higher stringiness indices of pressure-sensitive resin solutions containing tetrabutyl titanate in comparison with solutions containing diisopropoxy titanium diacetylacetonate especially at higher concentrations of the titanate ester.

Data for stringiness index of interpolymer solutions of Examples 3 and 6 through 11 formulated with various chelate esters of orthotitanic acid are presented in Table 5. The solids content of the solutions is 30 per cent. Ethanol forms 25 per cent of the solvent. The concentration of chelate ester of titanium is 0.4 parts per 100 parts by weight of resin.

EVALUATION OF PRESSURE-SENSITIVE RESINS

The pressure-sensitive resin solutions listed in Table 3 are cast on silicone release paper, and the cast films are dried at room temperature, then at 90°C. for 2 minutes. The (0.8 mil thickness) films are cooled to room temperature and applied to polyvinyl chloride film (Ultron Polyvinyl Chloride UL-58 Film, 3 mil thick, supplied by Monsanto Company). The laminate is cut into one inch strips. The strips are conditioned at 70°F. and 50% relative humidity for 24 hours. The release paper is removed and the strips are applied to steel panels (ASTM 1000-65) with a Pressure-Sensitive Tape Council roller. Peel strength is determined on an Instron Test Machine by peeling the strip at a 180° angle and at a rate of 6 inches per minutes from the steel panel. "Green" strength is gauged by comparing the peel strength of the bond 20 minutes after formation and 24 hours after formation. Data are presented in Table 6.

TABLE 5

STRINGINESS INDEX OF INTERPOLYMER SOLUTIONS CONTAINING CHELATE ESTERS OF ORTHOTITANIC ACID

| Resin Ex. | TITANIUM CHELATE ESTER | | | Stringiness Index (in.) |
|---|---|---|---|---|
| | n | $R_1$ | Chelating Agent | |
| 3 | 2 | iso-propyl | acetylacetone | <0.3 |
| 6 | 3 | iso-propyl | acetylacetone | <0.3 |
| 7 | 2 | octyl | benzoylacetone | <0.3 |
| 8 | 2 | butyl | 1,3-cyclohexanedione | <0.3 |
| 9 | 2 | octyl | 1,3-cyclopentanedione | <0.3 |
| 10 | 2 | butyl | ethyl acetoacetate | <0.3 |
| 11 | 2 | iso-propyl | acetylacetone | <0.3 |

The data show that titanate ester causes a decrease in peel strength in direct relation to the concentration of titanate ester. However, the effects of tetrabutyl titanate and diisopropoxy titanium diacetylacetonate are essentially equivalent and in no case is the peel strength reduced below a useful value.

The cohesive strength of the pressure-sensitive adhesive is gauged from the creep resistance of a 0.25 square inch 0.8 mil thick bond formed by the film of adhesive between a strip of Mylar Polyester film (a product of E. I. duPont de Nemours and Company) and a polished stainless steel bar. The Mylar strip is loaded with a one-pound weight. The bond is held in a vertical plane at 70°F. and 50% relative humidity and the time in hours for failure after application of the load is determined. The data are presented in Table 7.

TABLE 7

CREEP RESISTANCE OF PRESSURE-SENSITIVE RESINS (hours to failure)

| Titanate Concentration, g. per 100 g. resin | Type | RESIN | | | |
|---|---|---|---|---|---|
| | | Ex. 1 | Ex. 2 | Ex. 3 | Ex. 4 |
| 0 | none | 0.2 | 0.3 | 0.7 | 0.5 |
| 0.2 | TBT | 3 | 3 | 4.6 | — |
| | TAA | 3 | 2 | 4 | 10 |
| 0.4 | TBT | 10 | 55 | 40 | — |
| | TAA | 25 | 15 | 55 | 25 |
| 0.6 | TBT | — | 52 | — | — |
| | TAA | 55 | 145 | 155 | — |

Note that at low concentrations of titanate ester, the initial creep resistance is roughly the same for resins containing tetrabutyl titanate and those containing diisopropoxy titanium diacetylacetonate; but at higher concentrations, the creep resistance improves to a higher level for TAA formulations than for the TBT systems. An exception is the Example 2 system for which TBT may be a more efficient crosslinker.

While the present invention has been described with particular reference to certain specific embodiments thereof, it will be understood that certain changes, substitutions and modifications may be made therein without departing from the scope thereof. This invention also contemplates the use of fillers, extenders, stabilizers, antioxidants, plasticizers, tackifiers, flow control agents, adhesion promoters, dyes, etc. in the pressure-sensitive resin solutions and the pressure-sensitive resins of this invention.

TABLE 6

PEEL STRENGTH OF PRESSURE-SENSITIVE RESINS (pounds per inch width)

| Titanate Concentration, grams per 100 g. resin | Type | RESIN | | | | | |
|---|---|---|---|---|---|---|---|
| | | Example 1 | | Example 2 | | Example 3 | |
| | | 20 min. | 24 hr. | 20 min. | 24 hr. | 20 min. | 24 hr. |
| 0 | none | 3.8 | 4.0 | 5.0 | 8.6$_c$* | 4.2 | 4.7 |
| 0.2 | TBT | 3.3 | 4.0 | 4.0 | 7.0$_c$* | 3.9 | 4.4 |
| | TAA | 3.4 | 3.8 | 3.7 | 7.5$_c$* | 3.6 | 4.6 |
| 0.4 | TBT | 3.0 | 3.9 | 3.1 | 4.8 | 3.7 | 4.2 |
| | TAA | 3.0 | 4.2 | 3.0 | 5.5 | 3.2 | 4.2 |
| 0.6 | TBT | — | — | 2.5 | 4.4 | — | — |
| | TAA | 3.0 | 3.5 | 2.7 | 4.5 | 2.9 | 4.0 |

*Subscript "c" denotes cohesive splitting of the film.

The compositions of the present invention may be used as the adhesive component in pressure-sensitive tapes, films and foams. They adhere well to resin surfaces such as plasticized poly(vinyl chloride) Mylar, cellulose acetate, nylon, polyethylene and polypropylene, as well as to paper, metal and painted surfaces. They are especially useful as the adhesive component of decorative vinyl sheets and decals, conferring excellent shrink resistance to vinyl film. Their excellent tack retention, creep resistance and resistance to plasticizer migration make them useful as adhesives for vinyl foam and tiles. Their outstanding tack, wetting and holding power may be used to advantage in transfer adhesive applications.

Articles of manufacture such as tapes, decals, decorative vinyl sheets and transfer films containing the pressure-sensitive resin composition of the present invention are prepared by coating the resin on the appropriate substrate by conventional coating methods. Such articles conventionally include a release paper for temporary protection of the adhesive film until the adhesive bond is made. The thickness of the adhesive film is generally in the range of 0.2 to 5 mil.

Application of the film to the substrate is conventionally carried out on roll coaters such as reverse roll and gravure roll coaters. The resin solution viscosity is adjusted to between 25 and 5,000 centipoises with higher viscosities within the range preferred for reverse roll coating and lower viscosities within the range preferred for gravure coating. The coatings are applied to the substrate moving through the rolls at a rate of between 10 feet per minute and 1,000 feet per minute.

EXAMPLE 12

This Example is set forth to compare the performance of a resin solution formulated with tetrabutyl titanate with a resin solution formulated with diisopropoxy titanium diacetylacetonate in reverse roll application to a poly(vinyl chloride) substrate at a rate of 50 ft./min.

Polymer solutions made according to Example 1 are diluted to 30 per cent solids and formulated with 0.5 parts tetrabutyl titanate or diisopropoxy titanium diacetylacetonate per 100 parts of resin. The levels of titanate compound are selected to give the desired cohesive strength in the dried films. The TBT solution has a Stringiness Index of about 0.45 and gives poor coatings of rough surface texture and uneven thickness. A large number of "strings" are observed between the application roll and the substrate during the coating operation. These coatings are judged unsuitable for commercial use. The TAA solution has a Stringiness Index of about 0.20 and gives smooth coatings of uniform thickness. These films are judged satisfactory for commercial use.

What is claimed is:

1. An organic solvent solution comprising:
   A. a chelate ester of orthotitanic ester having the formula:

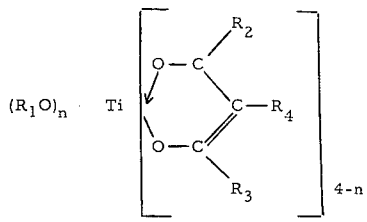

wherein $n$ is an integer of 2 or 3, $R_1$ is a $C_2$ to $C_{10}$ alkyl, alkenyl, substituted alkyl or substituted alkenyl group, $R_2$ is a $C_1$ to $C_6$ alkyl, alkoxy, alkenyl or alkenoxy group, $R_3$ is a $C_1$ to $C_6$ alkyl or alkenyl group or a $C_6$ to $C_{10}$ aryl group and $R_4$ is hydrogen or a $C_1$ to $C_6$ alkyl or alkenyl group, and $R_2$ and $R_3$ may be combined as an ethylene or a trimethylene group; and B. an interpolymer comprising:
  1. between 0.5 and 20 weight per cent of at least one monomer selected from the group consisting of N,N-diacetonylacrylamide and N,N-diacetonylmethacrylamide,
  2. at least one monomer selected from the group consisting of esters of acrylic acid and methacrylic acid containing from 6 to 20 carbon atoms, and
  3. optionally a monomer selected from the group consisting of α-olefins containing from two to 10 carbon atoms, vinyl esters of alkanoic acids containing from three to 10 carbon atoms, ethyl and methyl esters of acrylic and methacrylic acids, acrylonitrile, methacrylonitrile, styrene, and vinyl chloride, wherein the interpolymer has a weight average molecular weight in the range of 10,000 to 500,000 and a glass transition temperature in the range of −15° to −75°C.;

wherein there are between 0.01 and 4 parts by weight of the chelate ester per 100 parts of interpolymer and wherein the stringiness index of the solution is less than 0.3 inches.

2. The organic solvent solution of claim 1 wherein the chelate ester is the reaction product of a tetraalkyl or tetraalkenyl titanate wherein the alkyl or alkenyl group contains two to 10 carbon atoms, and an enolizable keto compound selected from the group consisting of acetylacetone, benzoylacetone, 1,3-cyclopentandione, 1,3-cyclohexandione, alkyl acetoacetates, and their $C_1$ to $C_6$ alkyl and alkenyl substituted derivatives, the mole ratio of tetraalkyl or tetraalkenyl titanate to enolizable keto compound being in the range of 1:1 to 1:2.

3. The organic solvent solution of claim 2 wherein the enolizable keto compound is acetylacetone.

4. A pressure-sensitive, creep resistant permanently tacky resin comprising:
   A. a chelate ester of orthotitanic ester having the formula:

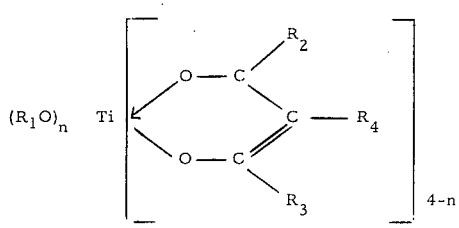

wherein $n$ is an integer of 2 or 3, $R_1$ is a $C_2$ to $C_{10}$ alkyl, alkenyl, substituted alkyl or substituted alkenyl group, $R_2$ is a $C_1$ to $C_6$ alkyl, alkoxy, alkenyl or alkenoxy group, $R_3$ is a $C_1$ to $C_6$ alkyl or alkenyl group or a $C_6$ to $C_{10}$ aryl group and $R_4$ is hydrogen or a $C_1$ to $C_6$ alkyl or alkenyl group, and $R_2$ and $R_3$ may be combined as an ethylene or a trimethylene group; and B. an interpolymer comprising:
1. between 0.5 and 20 weight per cent of at least one monomer selected from the group consisting of N,N-diacetonylacrylamide and N,N-diacetonylmethacrylamide,
2. at least one monomer selected from the group consisting of esters of acrylic acid and methacrylic acid containing from six to 20 carbon atoms, and
3. optionally a monomer selected from the group consisting of α-olefins containing from two to 10 carbon atoms, vinyl esters of alkanoic acids containing from three to 10 carbons atoms, ethyl and methyl esters of acrylic and methacrylic acids, acrylonitrile, methacrylonitrile, styrene, and vinyl chloride, wherein the interpolymer has a weight average molecular weight in the range of 10,000 to 500,000 and a glass transition temperature in the range of −15° to −75°C.;

wherein there are between 0.01 and 4 parts by weight of the chelate ester per 100 parts of interpolymer.

* * * * *